United States Patent [19]

Trevathan et al.

[11] Patent Number: 5,089,190
[45] Date of Patent: Feb. 18, 1992

[54] METHOD AND APPARATUS FOR HOLLOW CORE EXTRUSION OF HIGH VISCOSITY MATERIALS

[75] Inventors: Larry C. Trevathan, Avon Lake; Scott C. Hoover, Elyria; James C. Smith, Lorain, all of Ohio

[73] Assignee: Nordson Corporation, Westlake, Ohio

[21] Appl. No.: 434,357

[22] Filed: Nov. 13, 1989

[51] Int. Cl.$^5$ .............................. C08J 9/00; B29C 47/00
[52] U.S. Cl. ..................................... 264/45.9; 264/50; 261/DIG. 26; 425/4 C; 425/209; 425/382.4; 425/817 C; 422/139; 169/15; 521/74; 521/917
[58] Field of Search ............... 425/4 C, 817 C, 200, 425/209, 382.4; 264/45.8, 45.9, 45.4, 50; 261/DIG. 26; 521/74, 917; 422/139; 169/15

[56] References Cited

U.S. PATENT DOCUMENTS

| | | | |
|---|---|---|---|
| 4,060,356 | 11/1977 | Schott | 425/8 |
| 4,309,160 | 1/1982 | Poutanen et al. | 425/817 C X |
| 4,324,493 | 4/1982 | Colombo | 425/817 C X |
| 4,465,212 | 8/1984 | Boone | 222/504 |
| 4,630,774 | 12/1986 | Rehman et al. | 239/8 |
| 4,632,314 | 12/1986 | Smith et al. | 261/DIG. 26 X |
| 4,778,631 | 10/1988 | Cobbs, Jr. et al. | 261/128 |
| 4,876,051 | 10/1989 | Campbell et al. | 425/461 X |
| 4,883,420 | 11/1989 | Ozaki et al. | 425/461 X |

FOREIGN PATENT DOCUMENTS 87141604 2/1988 Germany.

OTHER PUBLICATIONS

Partial Translation of German Patent No. 87 14 160.4.
European Search Report dated 11-15-91.

Primary Examiner—David A. Simmons
Assistant Examiner—Thi Dang
Attorney, Agent, or Firm—Wood, Herron & Evans

[57] ABSTRACT

A method and apparatus for dispensing a foamable, pressurized solution of a gas and a high viscosity polymeric material in a manner which produces a foamed bead having a hollow core. Initial foaming occurs in a nozzle through which the solution is dispensed to atmosphere, at a core of the bead. Subsequent foaming of of the bead exteriorly of the core occurs outside the nozzle, and results in an extruded, foamed bead of high viscosity polymeric material having a tubular shape and particularly suitable for form-in-place gasket applications.

25 Claims, 2 Drawing Sheets

METHOD AND APPARATUS FOR HOLLOW CORE EXTRUSION OF HIGH VISCOSITY MATERIALS

FIELD OF THE INVENTION

This invention relates to a method and apparatus for dispensing high viscosity material in order to form a foamed hollow bead or a foamed bead of varying cross sectional density.

BACKGROUND OF THE INVENTION

Applicant's commonly assigned U.S. Pat. No. 4,778,631 discloses a method and apparatus for achieving continuous foaming of a variety of polymeric materials having a wide range of viscosities, including viscosities extending from about 50,000 up to above 1,000,000 centipoise. The disclosure of that patent is hereby expressly incorporated by reference in its entirety.

According to the teachings of this patent, force feeding of a gas and a high viscosity polymeric material into and through a low energy input mixer, with a low pressure drop across the mixer, avoids premature foaming or an unacceptable temperature rise of the high viscosity material. This mixing operation produces a pressurized solution of high viscosity polymeric material with a substantially uniform dispersion of gas bubbles therein.

Throughout the specification and claims of this application, the term "solution" is used to describe the liquid polymer containing a dissolved gas supplied under high pressure to a dispensing device, which creates a foamed polymeric structure when dispensed at atmospheric pressure. The term "solution" as used in the specification and the claims of this application is intended to define and encompass the broader generic definition of solution which is a homogenous mixture of a gas and a molten or liquid polymer, whether or not the gas molecules are in fact dissolved or dispersed among the polymer molecules.

After mixing, the foamable solution is then transferred under pressure to a dispensing device such as a valved nozzle, from which device the solution is dispensed through an outlet to atmospheric pressure. Upon emerging from the outlet of the dispenser, the gas evolves from the solution in the form of small bubbles which enlarge to cause the polymeric material to expand volumetrically. The resultant product in an uncompressed state becomes a homogeneous foam having gas pores or cells, which may be of various forms including both open and closed cells, and which are substantially evenly distributed throughout the polymer. As the polymer material cools or cures, a permanent homogeneous foam is created.

While a foamed high viscosity polymer may be suitable for use in a variety of applications, for instance as an adhesive, or a sealant or a coating, these foamed polymers are particularly suitable for use as a gasketing material. This is due to the fact that a gasket made from a foamed high viscosity polymer may be conveniently formed-in-place by extrusion, at a relatively low cost when compared to other methods of placement and securing gaskets, such as, for instance, adhesive mounting of a pre-formed or molded gasket. Additionally, the resulting formed-in-place gasket has a number of desirable physical characteristics related to the high viscosity of the polymer, such as increased durability, increased resiliency and improved memory, or recovery from compression.

Unfortunately, while formed-in-place gaskets offer a number of advantages over pre-formed, adhesively secured or mounted gaskets, their usefulness is limited by the maximum aspect ratio that can be achieved with an extruded bead of the material. The term "bead" in the context of this application refers to a continuous line of material extruded through a nozzle. Aspect ratio represents the ratio of the height of the bead to its width. Many gasket applications require bead dimensions with aspect ratios that are simply not obtainable with conventional extruding or dispensing methods or devices.

One of the reasons that higher aspect ratios are thought to be unobtainable by extrusion relates to the problem of slumping, or the tendency of an extruded bead to spread out or slump under its own weight before the bead sets-up or solidifies. The greater the amount of material extruded in an effort to achieve a desired height, the greater the weight of material that must be supported, and slumping occurs. Eventually, a point is reached where the amount of material that must be extruded in order to achieve a desired dimension becomes so great that the cost of material necessary to produce a formed-in-place gasket is higher than the cost of producing the gasket in another manner.

It is therefore an object of this invention to provide a formed-in-place gasket with improved bead characteristics, particularly an increased aspect ratio.

It is another object of the invention to provide a cost effective, formed-in-place gasket suitable for applications requiring relatively high aspect ratios.

It is still another object of this invention to provide a method and apparatus capable of extruding a bead of high viscosity polymeric material with an increased aspect ratio, and in a manner which results in a cost savings in material.

SUMMARY OF THE INVENTION

In order to achieve these objectives, and according to the practice of the invention, a bead of high viscosity material is dispensed from a nozzle and is prematurely foamed in order to form a hollow core bead or a bead having a reduced center density. Premature foaming of the material occurs at reduced pressure gas nucleation sites within a nozzle through which the material is dispensed. The gas nucleation sites are centrally located within a flow path that traverses the nozzle, thereby causing premature foaming to occur at a core of the bead while the solution is still in the nozzle. Subsequent foaming of the bead exteriorly of the core, after the material has been dispensed from the nozzle to atmosphere, produces a foamed hollow bead or a bead which is of reduced density in the center of the bead. Such a bead is particularly suitable for use in gasket applications, due largely to the capability of achieving an increase in aspect ratio over conventional extrusion methods.

In accordance with a preferred embodiment of the invention, an apparatus for extruding a hollow core or reduced center density bead includes a tank for holding a pressurized, mixed solution of a gas and a high viscosity polymeric material and a nozzle for dispensing a bead of the solution to atmosphere in a manner such that the core of the bead foams prematurely, while still in the nozzle. The nozzle defines a flow path which extends along a central axis of the nozzle or a so-called axis of dispensing, and which terminates in an orifice where the bead exits to atmosphere. A blunt tipped, retractable plunger in the shape of an inverted frustrum is axially aligned with the orifice, and when at rest, seats within the nozzle to prevent flow of the solution out the orifice. When the plunger is retracted from the seated position, the pressurized solution moves along the flow path toward the orifice. The structure of the side and bottom surfaces of the plunger and the inside walls of the nozzle cooperatively produce the desired effect of initial core foaming of the bead while in the nozzle.

Upstream of the tip, the flow path is annular in cross section and the solution does not foam because it remains under high pressure. However, immediately downstream of the blunt tip, the flow path increases substantially in cross sectional area, due to the abrupt termination of the plunger. At this location, the moving, pressurized solution experiences a pressure drop along the axis of the flow path, which causes some of the air in solution or mixed with the high viscosity polymeric material to come out of solution while still in the nozzle. This initial foaming is referred to as gas nucleation, and the centrally located volume or zone just downstream of the plunger tip is referred to as a gas nucleation site. Initial gas nucleation occurs in that portion of the flowing solution which is closest to the axis of the nozzle, or the portion that will become the core of the extruded bead. The rest of the solution foams after the bead has exited the nozzle orifice. As a result of the sequential foaming, the extruded bead of high viscosity polymeric material is tubular in shape.

The tubular foamed bead produced by this nozzle is particularly suitable for form-in-place gasket applications. A formed-in-place gasket produced from a foamed, tubular bead constitutes an improvement over prior, solid formed-in-place gaskets because a higher aspect ratio can be achieved by extruding a hollow or substantially hollow bead. This is partially due to the fact that, during extruding, the hollow or reduced center density extruded bead does not slump as much as a solid bead of the same diameter because there is less material, and hence, less weight that must be supported above.

Additionally, a hollow or substantially hollow core gasket is more durable and resilient than a typical solid core gasket. Once the foamed hollow bead is in place, the air pressure within the hollow tube tends to support the top of the tube, enabling the tube to maintain its extruded aspect ratio for a longer term. The air pressure inside of the tube also improves the memory of the hollow bead. That is, after compression, the air pressure forces the top of the bead back to its original position.

Moreover, in many applications, a hollow or substantially hollow bead will wear better under compression than a solid bead. This is due to the fact that deformation of a hollow bead under compression is typically radial or outward, while deformation of a solid bead under compression is usually tensile or along the length of the bead.

Finally, for a given diameter of bead, regardless of the required aspect ratio, a hollow or substantially hollow bead requires less material than a solid bead, and thus represents a cost savings in material.

These and other features of the invention will be more readily appreciated in view of the following detailed description and the drawings in which:

DETAILED DESCRIPTION OF THE DRAWINGS

Figure 1:
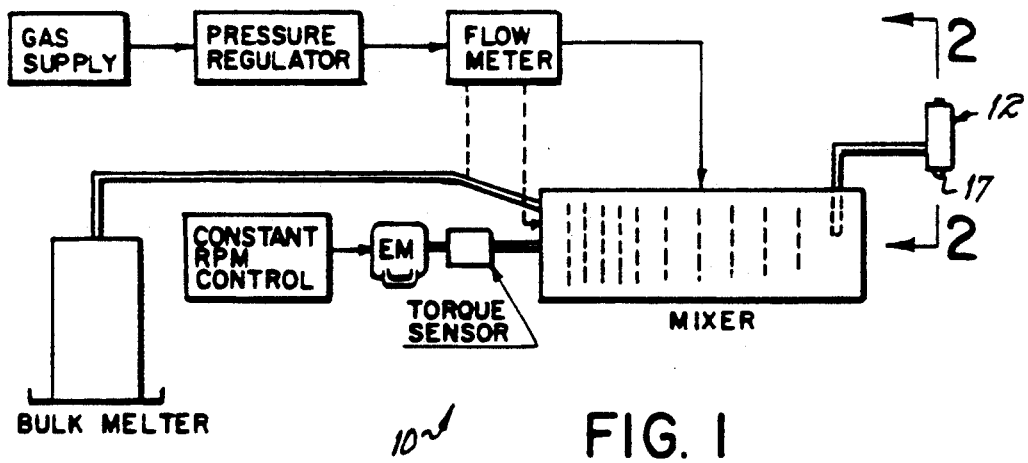
FIG. 1 is a schematic which shows one form of apparatus for mixing and dispensing a gas with a high viscosity polymeric material, under high pressure, to form a pressurized, foamable solution.

FIG. 1 shows an apparatus 10 for mixing, under high pressure, a high viscosity polymeric material with a gas to form a foamable solution. The apparatus 10 is discussed in significantly more detail in Cobbs et al. U.S. Pat. No. 4,778,631, incorporated by reference hereinabove. Apparatus 10 terminates at a spray gun 12 for dispensing or extruding the mixed, foamable solution to atmosphere, whereupon the reduced atmospheric pressure causes the gas to come out of solution, resulting in a foamed polymer. The spray gun 12 is manufactured by the assignee of this application, and is commercially referred to by part No. 60000 A11A. Typically, the extruded solution takes the shape of a bead. A number of high viscosity polymeric materials are known to function well with the spray gun 12 to form a hollow core bead. These materials include hot melts, RTV silicones and other sealants such as polyurethane hot melts, PVC plastisols, thermoplastic elastomers and polymer alloys. More particularly, a hot melt that has proved suitable is manufactured by National Starch, and is commercially identified by Cat. No. 70-7192. Similarly, RTV silicones that have proved suitable include GE Silicones 2511, Dow Corning 739 and Wacker Silicones T95.

Figure 2:
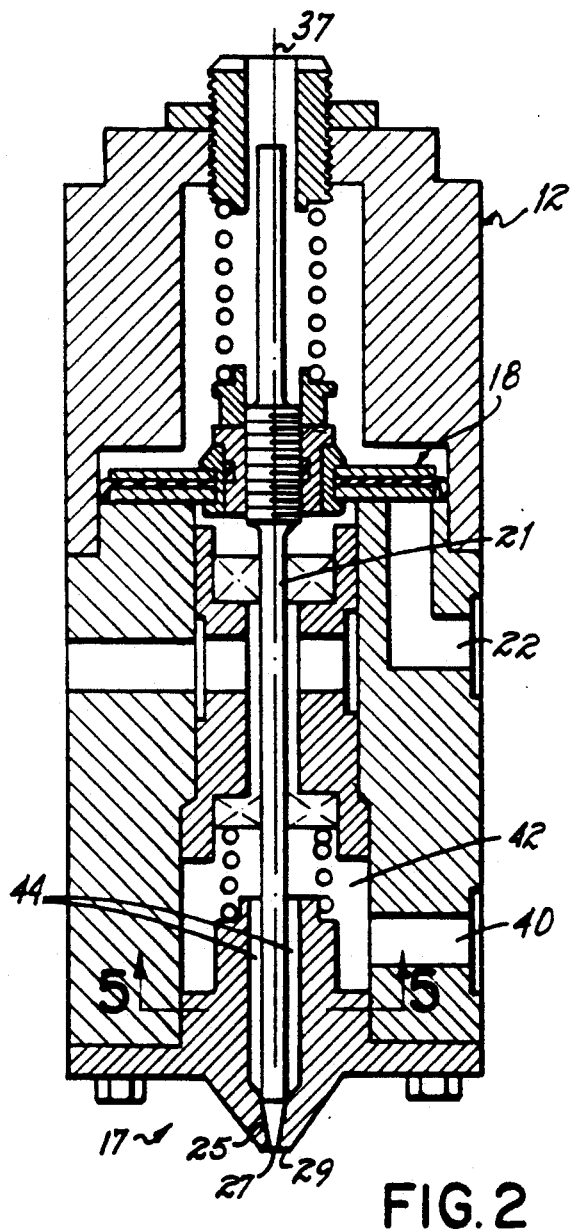
FIG. 2 is a cross-sectional view taken along lines 2—2 of FIG. 1 which shows one form of a gun for dispensing a foamable solution of high viscosity polymeric material to atmosphere.

As shown more clearly in FIG. 2, the spray gun 12 is designed to extrude the pressurized, foamable solution through a nozzle, indicated generally by numeral 17. Operation of the spray gun 12 is controlled by an air actuated, annular piston 18 connected to a plunger 21. Introduction of high pressure air through passage 22 forces the piston 18 against spring pressure upward (as viewed in FIG. 2), to retract the plunger 21 from a seated position against the internal walls 25 of the nozzle 17. The distance that the plunger 21 is retracted is commonly referred to as the lift distance. The lift distance is adjustable in gun 12, and adjusting in conjunction with a trial and error method will probably be necessary in order to produce a hollow foamed bead. The lift distance will vary for different materials, and at varying pressures.

Figure 3:
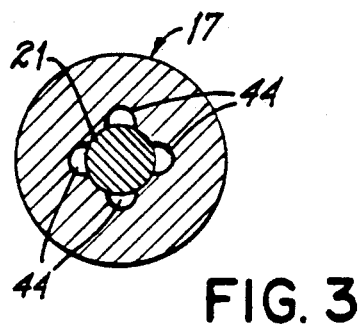
FIG. 3 is a cross sectional view taken along lines 3—3 of FIG. 2.

When seated, a blunt tip 27 of the plunger 21 is contiguous with the exterior walls 29 of nozzle 17, and no material is dispensed. This arrangement is sometimes referred to as a "zero cavity" nozzle. The exterior walls 29 define an orifice 31 through which the solution exits to atmosphere when the plunger 21 is retracted. Preferably, the plunger 21, blunt tip 27 and the orifice 31 lie along a central axis 37 of the gun 12. This axis is sometimes referred to herein as the axis 37 of dispensing material from the gun 12. A solution of gas and high viscosity material under pressure is fed to the gun 12 through inlet 40 to fill, first, reservoir 42 and then longitudinal channels 44 located adjacent to the plunger 21. The channels 44 terminate short of the orifice 31, and no material is dispensed when the plunger 21 is seated. FIG. 3 shows a cross sectional view of the four channels 44. Applicant's commonly assigned U.S. Pat. No. 4,579,255, which is expressly incorporated by reference in its entirety, provides a more complete description of the details and operation of a gun that is quite similar to the gun 12 utilized in this invention. The major structural difference between the two is that gun 12 has a plunger 21 with a blunt tip 27, while the gun shown in U.S. Pat. No. 4,579,255 has a pointed tip.

Figure 4:
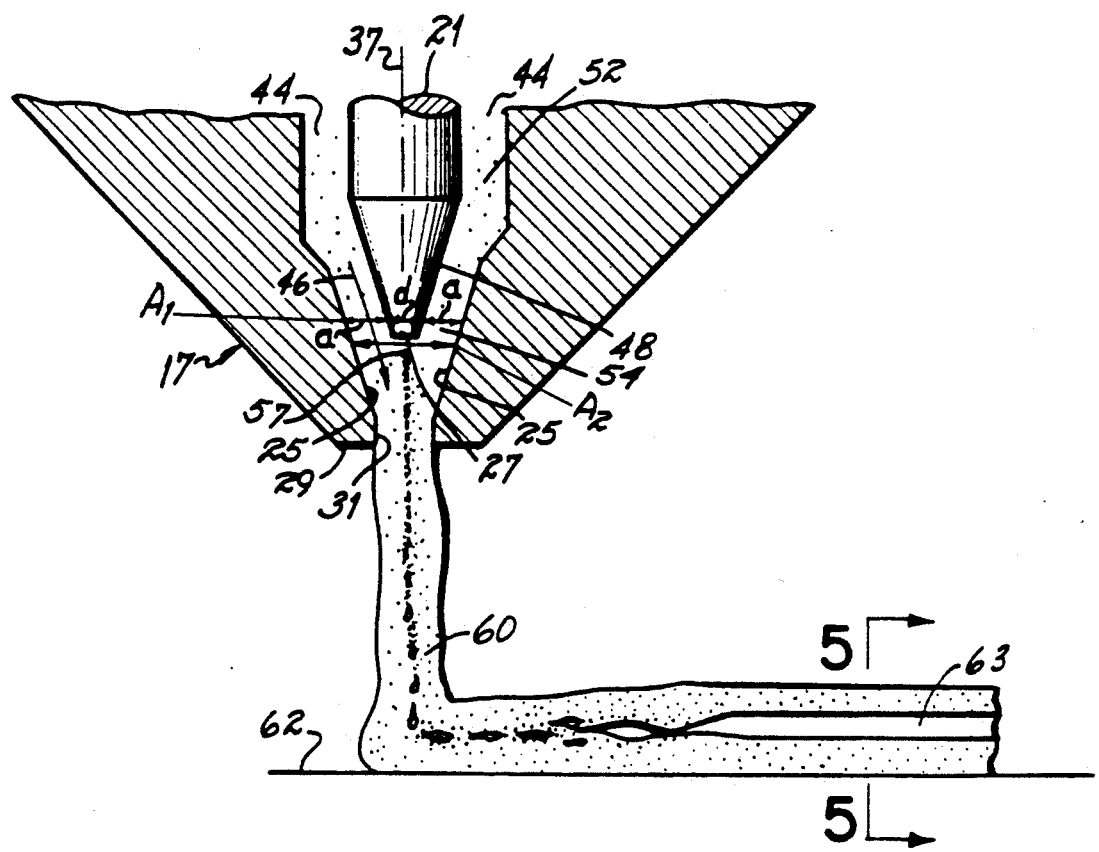
FIG. 4 is an enlarged cross-sectional view of a nozzle of the gun shown in FIG. 2, during dispensing of a foamable solution.

When the plunger 21 is retracted, as shown in FIG. 4, the pressurized solution in channels 44 traverses a flow path 46 through the nozzle 17 for eventual exit to atmosphere through orifice 31. Between the channels 44 and the blunt tip 27 of the plunger 21, the plunger 21 has an inverted frusto-conical shape, the walls 25 of the nozzle 17 taper to accommodate the plunger 21, and the cross sectional shape of the flow path 46 is annular, with a cross sectional area approximated by the following expression:

$$A_1 \approx \pi \left( \frac{d + 2a}{2} \right)^2 - \pi \left( \frac{d}{2} \right)^2$$

where d is the diameter of the plunger 21, and a is the radial distance from the exterior surface 48 of the plunger 21 to the interior wall 25 of the nozzle 17, for any horizontal (with respect to FIG. 4) cross section of the gun 12.

As the pressurized solution 52 traverses the channels 44 and that portion of the flow path 46 that lies upstream of blunt tip 27, there is no significant transition in either cross-sectional area or pressure drop due to cross sectional surface area. However, just downstream of the blunt tip 27, a section 54 of the flow path 46 undergoes a substantial increase in cross sectional area enroute to the orifice 31. This increase is due to the sudden termination of the plunger 21 at the blunt tip 27. As shown in FIG. 4, the cross sectional area $A_2$ of the flow path 46 downstream of the tip 27 is much greater than the area $A_1$ of the flow path 46 upstream of the tip 27.

As a result of this substantial increase in cross sectional area, the pressurized solution 52 experiences a pressure drop as it traverses section 54. The pressure drop occurs for the most part in a centrally located, three dimensional zone 57 located just downstream of the tip 27. The reduced pressure of zone 57 causes trapped gas to come out of solution along axis 37, just downstream of blunt tip 27. This process is referred to as gas nucleation, and the location of zone 57, which is determined by the position of the plunger 21 along axis 37, dictates the location along the flow path 46 where these gas nucleation sites will occur. The centrally located zone 57 represents the core of the bead 60 that is eventually extruded from the orifice 31. In another manner of reference, the reduced pressure of the flow path 46 downstream of the tip 27 provides centrally, or axially, located gas nucleation sites where gas that is exposed to a pressure drop begins to foam prematurely, or while it is still in the nozzle 17, and before the remainder of the bead 60 which only commences foaming as or after it leaves the nozzle and is exposed to atmospheric pressure.

Figure 5:
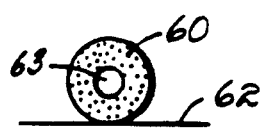
FIG. 5 is a cross-sectional view taken along lines 5—5 of FIG. 4.

After exiting the orifice 31, the remainder of the bead 60, or that portion of the bead 60 which resides exterior of the core, commences foaming upon exposure to atmospheric pressure. As a result of initial nucleation of the core within the nozzle 24, followed by subsequent foaming of the exterior of the bead outside the nozzle 17, the resultant extruded bead 60 has a hollow interior 63, or is tubular in shape as shown in FIG. 5. As described previously, this resultant tubular bead 60 is particularly suitable for use in form-in-place gasket applications. To produce a form-in-place gasket, the bead 60 is extruded on a substrate 62 that is desired to be sealed to another surface.

While I have described a preferred embodiment of an apparatus and method for forming a hollow core extrusion bead, it is to be understood that the invention is not limited thereby and that in light of the present disclosure of the invention, various other alternative embodiments will be apparent to a person skilled in the art. Specifically, while the bead formed by the practice of this invention is in fact completely hollow in the center of the solidified foamed bead, it will be appreciated that the invention could as well be practiced by extruding a bead which is not completely hollow but only substantially so, or by forming a foamed bead which is only of reduced density in the center of the bead rather than being hollow. Accordingly, it is to be understood that changes may be made without departing from the scope of the invention as particularly set forth and claimed.

I claim:

1. A method of forming a substantially hollow tube of foamed material comprising the steps of:
    mixing a gas with a high viscosity material under pressure to form a foamable solution;
    extruding a bead of said solution; and
    causing said gas to initially come out of said solution at a center portion of said bead and thereafter to come out of solution from said bead exteriorly of said center portion.

2. The method of claim 1 wherein said dispenser includes a nozzle which defines a flow path to atmosphere for said bead, and said causing step further comprises:
    providing gas nucleation sites within said flow path so that said gas comes out of said solution at said center portion while still in said nozzle.

3. The method of claim 2 and further comprising the steps of:
    retracting a blunt tipped plunger from a seated position within said nozzle, said gas nucleation sites being located adjacent said blunt tip.

4. The method of claim 2 wherein said material is a polymer having a viscosity ranging from about 50,000 to above 1,000,000 centipoise and wherein said foaming of said bead exteriorly of said center portion occurs outside of said nozzle.

5. A method comprising the steps of:
    providing a pressurized solution of high viscosity material and dissolved gas;
    dispensing said solution from a nozzle; and
    causing said gas to come out of said solution at a core of a bead formed during said dispensing step, followed by foaming of said solution exteriorly of said core, thereby to produce a foamed, annular, substantially hollow tube of said high viscosity material.

6. The method of claim 5 wherein said gas initially comes out of said head at said core while said solution is still within said nozzle.

7. The method of claim 6 wherein said solution foams exteriorly of said core while outside of said nozzle.

8. The method of claim 5 wherein said high viscosity material is a polymer having a viscosity ranging from about 50,000 to above 1,000,000 centipoise and wherein said nozzle includes a retractable blunt tipped plunger that controls dispensing of said solution to atmosphere and said causing step further comprises:
retracting said plunger to provide gas nucleation sites adjacent said blunt tip and within said nozzle, thereby to produce initial foaming of said solution at said core.

9. The method of claim 5 and further comprising the step of:
depositing said dispensed tube upon a substrate to form a hollow gasket.

10. An apparatus comprising:

first means for pressurizing and mixing a gas with a high viscosity material to form a foamable solution; and second means for dispensing said foamable solution and for causing said gas to come out of said foamable solution to produce a foamed bead of varying cross sectional density.

11. The apparatus of claim 9 wherein said second means is operable to cause said gas to come out of said foamable solution to form a hollow core tubular shaped bead.

12. The apparatus of claim 9 wherein said high viscosity material is a polymer having a viscosity ranging from about 50,000 to above 1 million centipoise.

13. The apparatus of claim 1 wherein said second means comprises:

a nozzle for dispensing said bead of said foamable solution to atmosphere; and means for initiating foaming of a center portion of said bead before said bead exits said nozzle.

14. The apparatus of claim 12 wherein said nozzle defines a flow path through which said foamable solution is dispensed to atmosphere, said flow path terminating in an orifice, and wherein said means for prematurely initiating foaming of said center portion of said bead includes a section of said flow path which undergoes a substantial increase in cross-sectional area enroute to said orifice.

15. The apparatus of claim 13 wherein said means for prematurely initiating foaming of a center portion of said bead further comprises:

a retractable plunger for controlling dispensing of said bead through said orifice, the position of said plunger within said nozzle determining the location of said substantial increase in cross-sectional area of said flow path.

16. The apparatus of claim 14 wherein said flow path tapers enroute to said orifice and said plunger has an inverted frusto-conical shape sized to seat within said flow path to close off flow of said solution to said orifice.

17. Apparatus for dispensing a foamable solution of a gas and a high viscosity material comprising:

a nozzle for dispensing a bead of said material to atmosphere;

means for causing said solution to initially foam at a center portion of said bead and for causing subsequent foaming of said bead exteriorly of said center portion so as to produce a foamed bead of high viscosity material having a lesser density in the center portion of said bead.

18. The apparatus of claim 17 wherein said means is operable to form a substantially hollow tubular shaped bead.

19. The apparatus of claim 18 wherein said nozzle has a flow path terminating in an orifice and means contained internally of said nozzle for affecting foaming of said center portion of said bead before said solution exits from said nozzle orifice.

20. The apparatus of claim 18 wherein said subsequent foaming of said bead occurs exterior of said nozzle.

21. The apparatus of claim 20 wherein a section of said flow path undergoes a substantial increase in cross-sectional area enroute to said orifice.

22. The apparatus of claim 21 which includes:

a retractable plunger for controlling flow of said bead through said orifice, the position of said plunger determining the location of said increased cross-sectional area of said flow path.

23. The apparatus of claim 22 wherein said flow path tapers enroute to said orifice, said plunger having an inverted, frusto-conical shape sized to seat within said flow path to control flow of said foamable solution out said orifice.

24. The apparatus of claim 17 wherein said high viscosity material is a polymer having a viscosity ranging from about 50,000 to above 1 million centipoise.

25. A method of forming a bead of foamable material having a center portion of reduced density relative to the exterior portion of said bead, which method comprises:

mixing a gas with a high viscosity material under pressure to form a foamable solution;

extruding a bead of said solution; and causing said gas to initially come out of said solution at a center portion of said bead and thereafter to come out of solution from said bead exteriorly of said center portion.

* * * * *

UNITED STATES PATENT AND TRADEMARK OFFICE
CERTIFICATE OF CORRECTION

PATENT NO. : 5,089,190

DATED : Feb. 18, 1992

INVENTOR(S) : Larry C. Trevathan

It is certified that error appears in the above-identified patent and that said Letters Patent is hereby corrected as shown below:

Col. 7, line 2, (claim 6) should read:

". . . of said bead. . ."

Signed and Sealed this

Third Day of August, 1993

Attest:

MICHAEL K. KIRK

*Attesting Officer*     Acting Commissioner of Patents and Trademarks